July 28, 1953

O. C. GEORGE 2,646,641

FISHING ROD HANDLE

Filed March 27, 1950

INVENTOR.
OSCAR C. GEORGE
BY
Charles S. Penfold
ATTORNEY

July 28, 1953
O. C. GEORGE
2,646,641
FISHING ROD HANDLE
Filed March 27, 1950
3 Sheets-Sheet 2
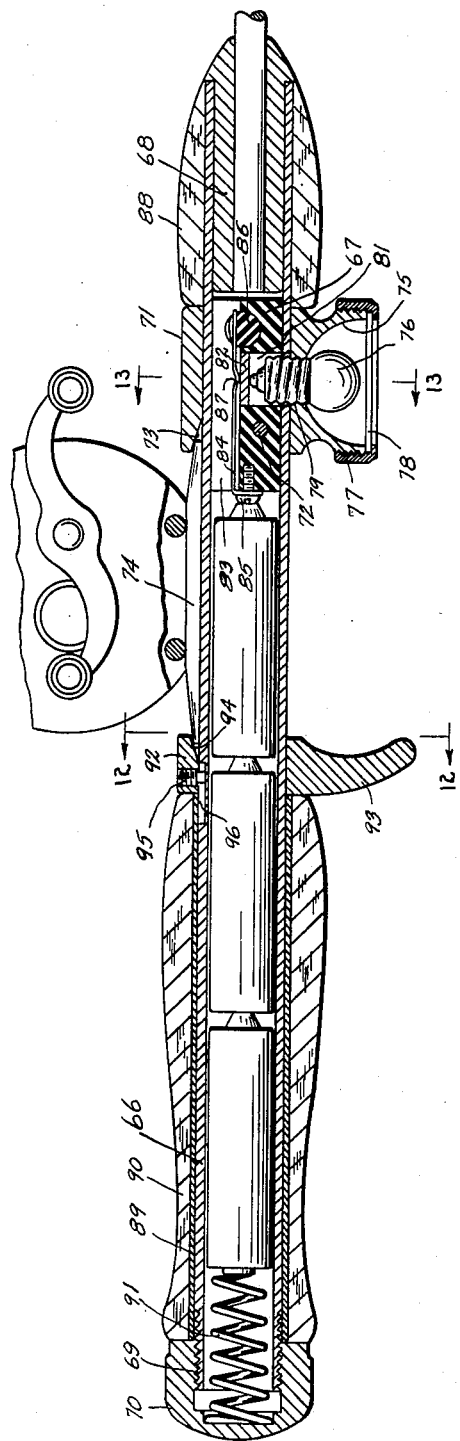
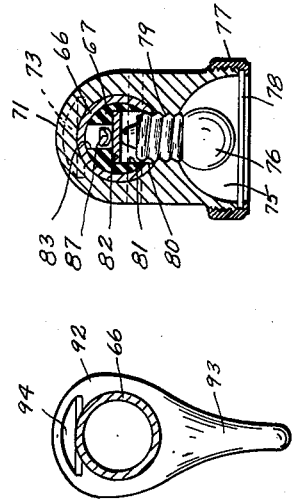
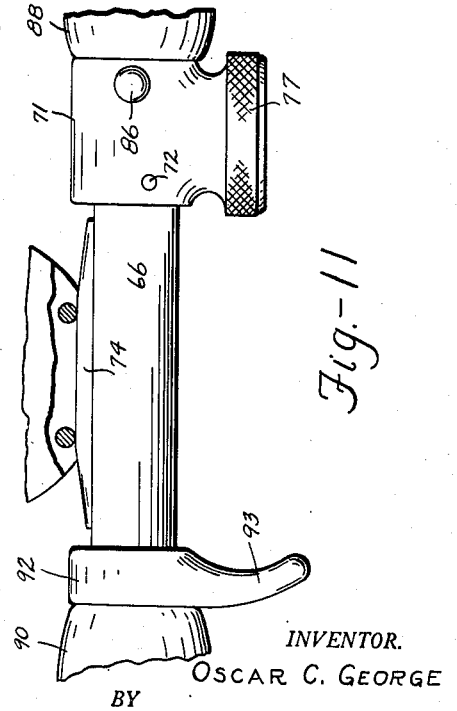
INVENTOR.
OSCAR C. GEORGE
BY
Charles S. Penfold
ATTORNEY July 28, 1953  O. C. GEORGE  2,646,641
FISHING ROD HANDLE
Filed March 27, 1950  3 Sheets-Sheet 3
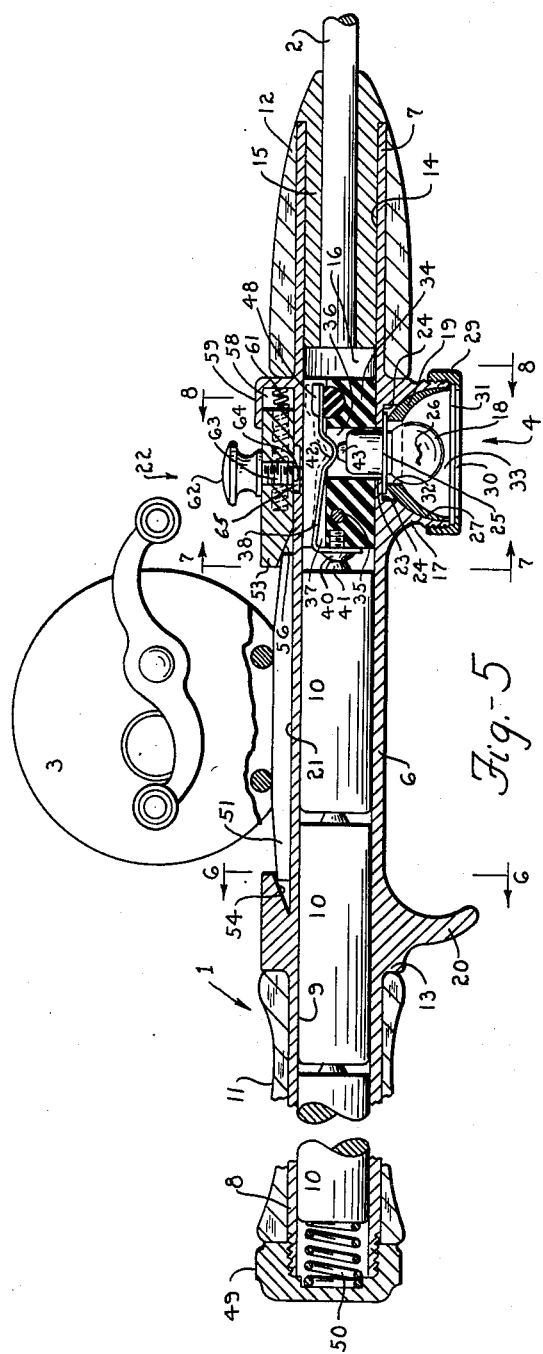
INVENTOR.
OSCAR C. GEORGE
BY
Charles S. Penfold
ATTORNEY Patented July 28, 1953

2,646,641

UNITED STATES PATENT OFFICE 2,646,641

FISHING ROD HANDLE

Oscar C. George, Bronson, Mich.

Application March 27, 1950, Serial No. 152,255

16 Claims. (Cl. 43—17.5)

This invention relates generally to fishing tackle and more particularly is directed to improved principles of design and construction embodied in a fishing rod or pole.

Most fishing is carried on during the daytime but there are many ardent fisherman who are enthusiastic about the thrills and adventures of night fishing. For those who enjoy the sport of fishing at night with a pole some form of artificial light is desirable to assist in arranging tackle and particularly when one has made a catch and is in the act of landing the fish. Lamps for this purpose are usually mounted in a fixed position or an ordinary flash light is used. These lamps or lights have proven unsatisfactory because it is practically impossible to properly maneuver a separate lamp under all conditions, particularly after a catch is made, as two hands are required to manipulate the rod and reel.

Accordingly, one of the principal objects of the subject invention is to design and construct the handle of the rod so that it constitutes a flash light whereby a beam or rays of light may be readily directed at the location or spot most desired at the appropriate time as the rod is manipulated. More specifically in this respect, an object is to provide a lamp for this purpose in which the light beam is prefocused in a direction laterally from the underside of the handle.

A significant object of the invention is to provide the handle with an enlargement which serves a plurality of uses, such as a housing for a lamp and a switch mechanism, including means associated therewith which assist in retaining the mounting plate of a reel in place.

Also an object of the invention is to provide a construction in which the enlargement is slidable on the body of the handle, and in which a single element serves to hold a slidable finger grip, sleeve, and handle grip relative to the body and one or more flashlight batteries in the body. The arrangement is such that the single element can be manipulated to actuate the finger grip to assist in holding the reel mounting plate on the body.

A particular object of the invention is to design and construct the handle so that it provides a fluid liquid light chamber or housing for a battery or batteries and other parts of the flash light.

Another object of the invention is to locate the switch on the handle for convenient operation.

Another object of the invention is to provide the handle with improved means for detachably connecting a reel thereto.

An additional object of the invention is to provide a handle assembly which is compact, well balanced, relatively light in weight, non-corrosive, and attractive in appearance.

Additional attributes of the invention reside in its simplicity of design and construction, durability, and economy of manufacture and assembly.

Other advantages of the invention will become apparent after the description hereinafter set forth is considered in conjunction with the drawings annexed hereto.

In the drawings wherein like or corresponding parts or elements are identified by the same numerals:

Figure 5 is a longitudinal sectional view taken substantially on line 5—5 of Figure 2;

Figure 6 is a transverse section taken substantially on line 6—6 of Figure 5;

Figure 7 is a transverse section taken substantially on line 7—7 of Figure 5, illustrating structural details;

Figure 8 is a transverse section taken substantially on line 8—8 of Figure 5 showing the switch in an operative position;

Figure 9 is a transverse section similar to Figure 8 showing the switch in an inoperative position;

Figure 10 is a side view of a modified construction of a handle assembly with a reel attached thereto;

Figure 11 is a partial side view of the construction shown in Figure 10, indicating the mode of attaching a reel to the handle of a fishing rod;

Figure 12 is a transverse section taken substantially on line 12—12 of Figure 10; and Figure 13 is a transverse section taken substantially on line 13—13 of Figure 10 showing details of a switch.

The subject application is a continuation in part of my copending application Serial Number 21,390, filed April 16, 1948.

Figure 1:
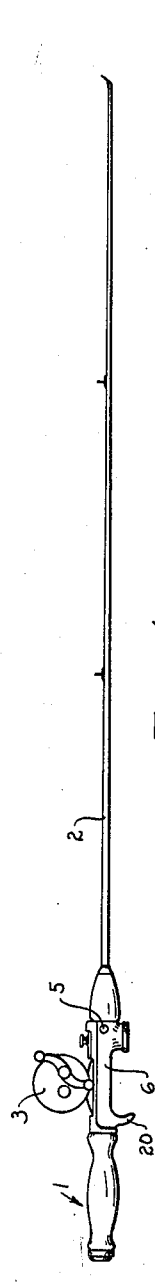
Figure 1 is a side view of a fishing rod with a handle embodying the invention.
Figure 2:
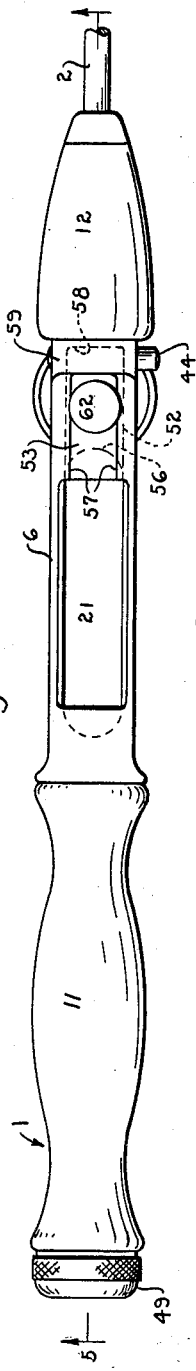
Figure 2 is an enlarged top view of the handle assembly illustrated in Figure 1.
Figure 3:
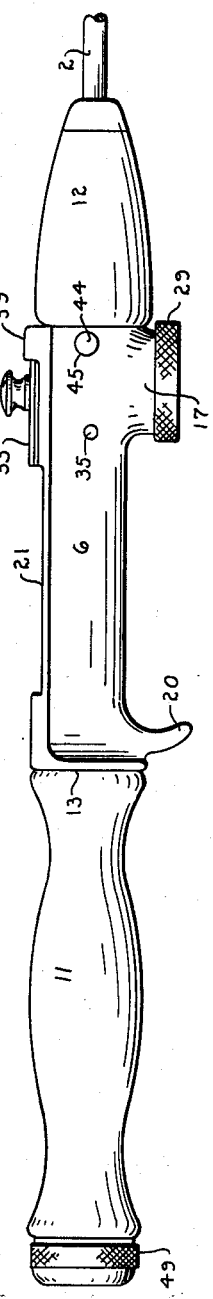
Figure 3 is a side view of the assembly exemplified in Figure 2.
Figure 4:
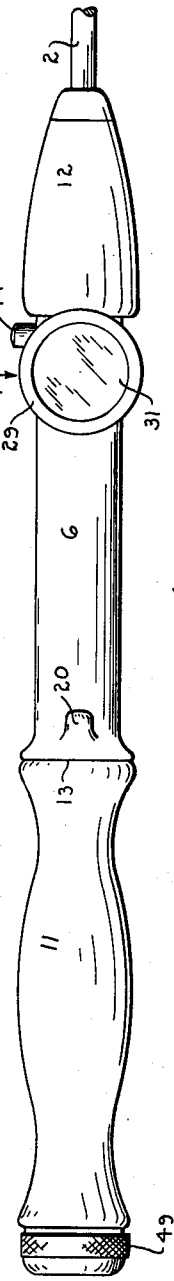
Figure 4 is a bottom view of the assembly.

As exemplified in Figures 1 through 9 of the drawings, number 1 designates a handle of a fish pole or rod 2, 3 a reel detachably carried by the handle, 4 a lamp, and 5 a switch mechanism for controlling the illumination of the lamp.

The handle may be designed and constructed in various desirable ways, but preferably includes a central or intermediate body section 6, a cylindrical forward extremity 7, and a rear cylindrical extremity 8 somewhat longer than the forward extremity and the central section, but of the same cross-sectional dimension as the forward extremity. The handle may be made from any suitable material, such as die cast aluminum and provided with a cylindrical chamber or bore 9 extending throughout its full length, which chamber, among other things, houses a plurality of batteries 10 and part of the switch mechanism 5. The cylindrical extremities are preferably covered by suitable conventional cork grips 11 and 12 secured in place by any means such as glue. It will be noted that the central section includes an enlarged circular portion 13 which, among other things, provides an abutment for an end of the grip 11.

The forward extremity of the handle provides a socket 14 for the reception of a bushing 15 for detachably securing the butt end of the rod 2 in coaxial relationship with the handle. Obviously, bushings of various sizes or a universal bushing may be employed so that the socket will accommodate rods, the butt ends of which vary in cross sectional dimensions.

The handle adjacent the junction between the central body section and the forward extremity may be provided with a separate partition 16 as shown, or an integral transverse wall for the purpose of sealing off one end of the cylindrical chamber to prevent entry of water or foreign matter into the switch mechanism and other internal parts of the assembly. This factor is important as any water, particularly salt water, will cause serious damage to the working parts and swelling of a battery or batteries adapted to be disposed in the chamber.

The central section 6, which supports the reel, is preferably made generally square or rectangular in cross-section. Its bottom or under side, adjacent the forward end, is preferably provided with an enlarged laterally extending hollow offset, to constitute a socket 17 for an electric lamp bulb 18 and reflector 19. The rear end of the under side is provided with a curved finger catch or stop 20 spaced longitudinally from and projecting in the same general transverse direction as the offset lamp socket. The under side of the body is preferably curved or rounded as illustrated so as to facilitate gripping the handle. The upper side of the body section is preferably provided with a longitudinal channel or recess 21 and fastening means 22 for detachably connecting the reel to the handle and will be described more in detail subsequently.

Referring again to the lamp socket, the details of which are clearly illustrated in Figure 5 of the drawing, the socket is preferably provided with a round opening 23 for the cylindrical base portion of the lamp. This opening communicates with the interior of the cylindrical chamber and is arranged substantially transverse to the longitudinal axis of the handle. The opening is counter-recessed to form an annular seat 24 for a radial flange or lateral positioning means 25 on the lamp base so as to pre-focus the position of the filament 26 in the lamp. The interior of the socket is further provided with a concave bearing surface 27 which is engaged by a reflector 19, which although of metal, may be made of other material suitable for the purpose. The extremity of the socket is annular and exteriorly threaded to support an internally threaded cap 29, having an aperture 30 in its end wall. A lens 31 within the cap is adapted to be forced by the cap into engagement with the annular extremity of the socket including the reflector 19 so that the latter bears against the radial flange 25 on the lamp, to hold such parts firmly assembled. If found desirable, the radial flange may be arranged to engage the inner face of the reflector to predetermine the position of the lamp filament with respect to the reflecting surface of the reflector. The lens 31 is preferably transparent and made from a pyroxylin plastic so that it may also serve as a resilient washer or gasket to seal off and exclude the entry of water or foreign matter into the lamp socket assembly and interior of the chamber. It also has the advantage of being non-breakable. The fact that the reflector engages the bearing surface 27 and the radial lamp flange the seat 23 also assists in sealing off the interior of the chamber from the atmosphere. The reflector is provided with an opening 32 of a size to permit the glass envelope of the lamp to pass therethrough and its inner reflecting surface 33 is preferably of a parabolic curvature so as to focus the beam of light in a predetermined direction conducive to use under all conditions associated with fishing. The parts constituting the lamp and socket sub-assembly may, of course, be designed and constructed in various ways. For example, the lamp socket assembly could be constructed and arranged for adjustment to cast the beam at any desired angle with respect to the handle.

An elongated carrier 34 of insulating material is preferably pressed into the cylindrical chamber 9 to a location against the partition 16 and opposite the lamp socket and is secured in place by a cross pin 35 extending through the carrier and holes provided therefor in the handle. The carrier is provided with a transverse circular clearance opening 36 coaxial with and of the same diameter as opening 23 so as to accommodate the cylindrical base of the lamp. The carrier is also provided with a longitudinal groove 37 which intersects the opening 36, and provides clearance space for the operation of an elongated yieldable bridge member 38 constituting a part of the switch mechanism.

The inner end of the bridge member is bent laterally to form a tab 39 bearing against the inner end of the carrier, and a screw 40 passes through a hole in the tab and into the carrier for securing the bridge and carrier together. The head of the screw serves as a stationary terminal contact to engage a contact 41 on the foremost battery. The remainder of the bridge is freely yieldable and includes an intermediate rounded offset contact portion 42 which is adapted for movement into and out of engagement with the end contact 43 on the lamp by means of a cylindrical actuating rod 44 of insulating material for controlling illumination of the lamp.

The actuating rod is mounted for reciprocal movement in a direction transverse to the longitudinal axis of the handle through a round hole 45 provided therefor in the carrier and suitable aligned holes in the handle. This rod in addition to the pin 35 assists in holding the carrier 34 in place in chamber 9. The rod is of a length sufficient to locate at least one of its ends exteriorly of the handle adjacent its forward extremity for convenient manual operation. An intermediate portion of the actuating rod is formed with a pair of spaced but closely associated generally concave notches or interruptions 46 and 47 which respectively receive the free end 48 of the yieldable bridge member. The free end is preferably curved to form a convex surface so as to nest in each of the notches and at the same time permit easily operation of the bridge and without subjecting the same to distortion.

And end cap 49 threadedly engages the cylindrical rear extremity of the handle and carries a conventional helical spring 50 for maintaining the batteries in intimate electrical contact with one another and in circuit with the stationary contact 40, the metal handle, and the radial lamp flange 25, the latter including the lamp base constituting conventional contact means insulated from its end contact 43.

When the actuating rod 44 is reciprocated in one direction, the free end 48 of the bridge 38 will be caused to nest in the notch 46 as exemplified in Figures 5 and 8, in which position the contact portion 42 on the bridge will engage the end contact 43 on the lamp bulb to illuminate the lamp. When the rod is properly reciprocated in an opposite direction, the free end of the bridge will enter the notch 47, which is of a depth somewhat less than the notch 46 to displace the bridge, so that the contact thereof will disengage the lamp contact, as illustrated by the dotted lines in Figure 5 to open the circuit. Since the bridge is formed so that the contact thereof is normally urged toward the lamp contact, the rod is automatically held in either of its actuating positions by the inherent resilience of the bridge when seated in either notch. Due to the fact that the contact portion 42 of the bridge is normally positioned within the opening 36 in the carrier 34, the bridge is in some measure maintained in a central position within the longitudinal recess 37 in the carrier.

The fastening means employed to facilitate the attachment of a conventional reel to the handle will now be described. The longitudinal channel 21, above referred to, is generally rectangular in shape and extends substantially the full length of the central body section 6 of the handle. The rear part of the channel is utilized to receive the generally rectangular mounting plate 51 of the reel and its forward part provides a guideway 52 for a slidable locking member 53 whereby to detachably connect the reel to the handle.

The rear part of the channel within which the mounting plate is adapted to be disposed is preferably of a depth to conceal the longitudinal edges of the plate and the bottom wall of the channel is made substantially planar so to provide a firm bearing seat, all of which assists to prevent lateral displacement of the reel.

The upper side of the body section is preferably rounded adjacent the inner end of the channel and is provided with a pocket 54 which in effect constitutes a continuation of the channel. This pocket receives one end of the mounting plate. The inner upper wall of this pocket constitutes a cam surface 55 whereby to assist in wedging the tapered end of the plate snugly in place. The other end of the plate is adapted for disposition in an undercut cam-like recess 56, similar to the pocket, provided in the rear end of the locking member 53.

The body section is also formed with a pair of corresponding parallel flanges 57 which extend upwardly and inwardly to overlie the planar bottom wall of the channel to provide a dovetail fit between the locking member and guideway 52, the cross-sectional shape of the member and guideway being substantially the same in order that such member is restricted to a reciprocating movement.

A wall 58 constitutes one end of the guideway 52 and such end is preferably covered by an arched bridge portion 59 of the body. A pair of parallel round holes 60 extend inwardly at one end of the locking member and a pair of elongated helical springs 61 are disposed in the holes with their outer free extremities normally engaging the end wall 58 of the guideway to normally maintain the member in a predetermined position so that it is necessary to move the member longitudinally and forwardly of the handle to overcome the resilience of the springs before the mounting plate 51 of the reel can be released from its channel seat. The arched bridge portion 59, among other things, serves to protect and conceal portions of the springs 61 from view. It will be noted that the locking member is of a length somewhat less than the length of its guideway, and that the outer surface of the member is convex and more or less converges into the curved exterior surfaces of the inturned flanges 57 to present a pleasing appearance. All other exterior surfaces of the complete assembly are also fashioned to obtain a harmonious and well-balanced attractive unit.

The locking member is preferably secured in place for longitudinal movement by means of a thumb screw 62, the shank of which extends transversely through a hole 63 provided therefor in the member with its inner pin end 64 disposed in a central longitudinal slot 65 formed in the planar base wall of the guideway. When the inner pin end of the screw is in the slot, the latter limits the extent to which the locking member can be reciprocated in either direction. The locking member and springs associated therewith may be easily removed from the handle by merely disconnecting the screw from such member.

Although the connecting means 22, including the locking member 63 are illustrated as being located adjacent the forward extremity of the intermediate body section, its position could be reversed for disposition near the rear extremity of said section. It is to be understood that the switching mechanism may also be located at some other desirable place for convenient operation at any time.

The handle assembly in Figures 10 through 13 of the drawing embodies improved principles of design and construction and will now be described. The handle, among other things, includes a cylindrical elongated tube 66 which houses a plurality of batteries and a cylindrical carrier 67 of insulating material constituting a component of a switch. A bushing 68 is housed in the forward end of the tube for receiving the butt end of a rod and the rear end of the tube is exteriorally threaded at 69 to support an internally threaded cap 70.

An enlargement 71 is slidably mounted on the tube and anchored in place by a cross pin 72 extending through the enlargement, tube and carrier. The upper portion of the enlargement is provided with an internal cam surface 73 which in combination with the tube forms a recess to receive and hold one end of a reel mounting plate 74. The enlargement includes a lower offset generally cylindrical portion which projects outwardly from the tube. The end of the offset is formed with a concave recess 75 which is preferably polished and acts as a reflector for a lamp 76. The offset is also exteriorly threaded and supports an internally threaded cap 77. A lens 78, preferably of plastic, is secured in sealed relationship with the offset and over the concave recess and lamp by the cap. The enlargement is provided with a threaded aperture 79 which receives the threaded base of the lamp and the tube is provided with a transverse opening 80 and the carrier 67 with a transverse opening 81. These openings are aligned with the threaded aperture 79 and provide clearance for the lamp base. A metal disk 82 is disposed in the opening 81 for engaging a terminal on the lamp base.

The carrier is provided with a longitudinal channel recess 83 in its upper side which intersects its transverse opening 81. An elongated yieldable bridge 84 is arranged in the channel recess and its inner end is preferably offset. A screw 85 extends through the offset into the inner end of the carrier so that the head of the screw constitutes a contact for engaging the center terminal of the foremost battery. The outer end of the bridge is disposed in the path of a reciprocable switch actuating member 86. This actuating member is made of dielectric material and is preferably constructed and mounted in substantially the same manner as member 44 in the first embodiment. More particularly in this respect, when the actuating member 86 is manually moved in one direction a bent intermediate portion 87 of the bridge will be moved out of engagement with the disk to interrupt the flow of current and when moved in an opposite direction, the bridge, due to its inherent resiliency, will fall back so that the intermediate portion will engage the disk to close the circuit and illuminate the lamp.

The forward end of the tube is provided with a handle grip 88 which abuts the enlargement. A metal cylindrical sleeve 89 is slidably and rotatably mounted on the rear extremity of the tube. A handle grip 90 is slidably and rotatably mounted on the sleeve. It will be noted that the length of the sleeve and grip are substantially the same and that a portion of the threaded end of the tube extends beyond the rear end of the sleeve and grip for supporting the cap 70. A helical spring 91 is arranged in the tube with one end engaging the base of the rearmost battery and its other end secured in the cap for urging the batteries in contacting relationship and the terminal on the foremost battery in engagement with the screw 85.

Improved means are provided for holding the rear end of the reel mounting plate in place. The means employed for this purpose preferably includues a holding element or finger hook member which is slidably mounted on the tube 66. This holding element includes a cylindrical portion 92 which receives the tube and an integral finger hook portion 93. The upper part of the cylindrical portion is provided with an internal cam surface 94 which in combination with the tube forms a recess for receiving the rear end of the mounting plate 74. The upper part of the cylindrical portion of the holding element is also preferably provided with a set screw 95, the inner end of which is received in a longitudinal slot 96 provided in the tube for the purpose of preventing relative rotational movement between the holding element and tube.

With this unique arrangement of components the cap serves to hold the sleeve 89 and grip 90 assembled with respect to each other and with respect to the tube and against the cylindrical portion 92 of the holding element to maintain the holding element in position for detachably engaging and holding the rear end of the mounting plate of the reel in supporting relationship with the tube. The cap also serves to lock the batteries in the tube.

In view of the foregoing description, it will be manifest that improved principles of design and construction have been embodied in a handle of a fishing rod or pole, including provision whereby a beam of light may be directed outwardly, preferably from the under side of the handle for illuminating an area opposite said side. With this improvement, the pole may be readily manipulated to cast the beam to illuminate any area desired, within practical limits, the lamp being preferably so arranged that the beam will be directed to illuminate the appropriate spot so that one may clearly see what maneuvers may be necessary when a caught fish is being hauled in and landed. The device is well balanced and easily handled and by a mere simple wrist action movement, the beam may be played into the boat from which one may be fishing to examine fishing tackle and paraphernalia.

It will also be evident that novel switching mechanism is provided for controlling the circuit to illuminate the lamp, including an improved liquid tight lamp socket assembly. Moreover, that unique means are employed for detachably connecting a reel to the handle.

While I have disclosed the invention with great particularity, and in the best form in which I have embodied it thus far, it will be readily understood that various changes in the arrangements, constructions and combinations of parts, as well as substitution of equivalents and substitution of materials may be made in the device without departing from the spirit of the invention as more definitely determined by the appended claims.

I claim:

1. A fish pole having a tubular housing for a battery, said housing having on one side thereof reel plate holding means, said means including a slidable clamp and a fixed clamp, said fixed clamp being formed to provide a lamp enclosure whereby a beam of light may be directed laterally from another side of such housing, means for electrically connecting a lamp in a circuit with a battery, and a manual controlled switch for opening and closing the circuit.

2. A flash light body having a tubular portion for receiving a battery means in the body whereby a fish pole may be attached at one end thereof, said portion having on one side thereof reel plate holding means, said holding means including a slidable clamp and a fixed clamp, said fixed clamp forming an enclosure for a lamp bulb for directing a beam of light in a direction laterally from another side of the body, and a manually controlled switch for controlling the operation of the flash light.

3. A flashlight comprising a tubular handle providing a casing for a battery, said handle having a seating zone for the mounting plate of a reel at one side of the handle and a socket at the outer end thereof for receiving a fishing rod, said handle being provided with a sleeve between the socket and reel plate seating zone, said sleeve having means adjacent said one side for engaging one end of a reel mounting plate and a portion providing a housing for a part of a lamp assembly, and switch means located at one end of the socket and between the reel plate engaging means and the lamp assembly part for controlling the operation of a lamp constituting a component of the lamp assembly.

4. A flashlight comprising a tubular handle providing a casing for a battery, a seat for the mounting plate of a reel provided along the upper side of the handle, a socket at the outer end of the handle for receiving a fishing rod, said handle being provided with a sleeve between the socket and reel seat, said sleeve having means adjacent its upper side for engaging one end of a reel mounting plate and its lower side providing an enclosure for the bulb of a lamp, switch means carried by the handle, and means extending through a part of said sleeve for operating the lamp.

5. A flashlight comprising a tubular handle providing a casing for a battery, a seat for the mounting plate of a reel provided on the handle, a socket provided at the outer end of the handle for receiving a fishing rod, said handle being provided with a sleeve disposed adjacent the base of the socket, said sleeve constituting a support for a lamp and provided with means for engaging one end of a reel mounting plate, and switch means carried by the sleeve for controlling the operation of a lamp.

6. A flashlight comprising a tubular handle providing a casing for a battery, an elongated seat for the mounting plate of a reel provided on the handle, a fitting at the outer end of the handle for connection with a fishing rod, said handle being provided with a sleeve disposed adjacent the fitting and the outer extremity of the reel seat, said sleeve constituting a support for a lamp and provided with means for engaging one end of a reel mounting plate, switch means for a lamp arranged in the housing, and manually operable means extending from the sleeve for actuating the switch means.

7. A flashlight comprising a tubular body providing a casing for a battery, a handle at the inner end of the body, a socket at the outer end of the body for receiving a fishing rod, said body having an elongated intervening portion disposed between the handle and socket, a seat for the mounting plate of a reel provided along the upper side of the intervening portion, the outer extremity of said intervening portion located adjacent to the socket being provided with a sleeve movable means adjacent the inner extremity of the intervening portion and means at its said outer extremity for engaging the ends of a reel mounting plate, the lower side of the sleeve providing en enclosure for a lamp bulb, switch means arranged in the body for a lamp bulb and having a part exposed for manipulation, a slidable member on the body, and a cap for closing one end of the body, said cap being movable whereby the slidable member can be shifted to actuate the movable means when desired.

8. A flashlight comprising a tubular handle providing a casing for a battery, a seating zone on the handle for supporting the mounting plate of a reel, a socket at the outer end of the handle for receiving a fishing rod, said handle being provided with a sleeve between the socket and reel plate seating zone, means adjacent one extremity of the seating zone for engaging one end of a mounting plate, said sleeve having means for engaging the other end of a mounting plate and providing a housing for a lamp bulb, and switch means located at one end of the socket for controlling the operation of a lamp bulb.

9. A flashlight comprising a tubular handle providing a casing for a battery, a seating zone on the handle for supporting the mounting plate of a reel, receiving means at the outer end of the handle for supporting a fishing rod, said handle being provided with an enlargement between the reel plate seating zone and the receiving means, said enlargement having means for engaging and holding one end of a mounting plate and providing a housing for a lamp, a switch located adjacent the receiving means and in conjunction with the lamp for controlling the operation of the lamp, slidable means on the handle for engaging and holding the other end of a mounting plate, a handle grip slidably mounted on the handle, and a member for holding a battery in the handle and the handle grip against the slidable means in a manner whereby the slidable means may be caused to hold or release a mounting plate with respect to said seating zone.

10. A flashlight comprising a tubular handle providing a casing for a battery, a seat for the mounting plate of a reel provided along one side of the handle, connection means at the outer end of the handle to which a flashing rod may be connected, said handle being provided with an enlargement between the connection means and the seat, said enlargement having means adjacent the said one side of the handle for engaging one end of a mounting plate, said enlargement providing a support for a lamp, switch means for the lamp, a slidable member on the handle for engaging and holding the other end of a mounting plate, and means carried by the handle for holding a battery in the handle and actuable to slide the slidable member relative to the handle whereby a mounting plate may be detachably supported on said seat.

11. A flashlight comprising a tubular handle providing a casing for a battery, a seat provided on the handle for the mounting plate of a reel, said handle being provided with an enlargement adjacent its forward extremity, said enlargement having means for engaging one end of a mounting plate, said enlargement providing a housing for a lamp, a switch mechanism supported jointly by the handle and enlargement, a finger grip slidable on the handle for engaging the other end of a mounting plate, and a single element for locking a battery in the housing and being operable to actuate the finger grip.

12. A flashlight comprising a tubular handle providing a casing for a battery, a seat provided on the handle for the mounting plate of a reel, said handle being provided with an enlargement adjacent its forward extremity, means provided adjacent the enlargement for holding one end of a mounting plate on the seat, said enlargement providing a housing for a lamp, a switch arranged substantially in the handle and having a part extending into the enlargement for manual actuation to control the operation of a lamp, and a finger grip carried by the handle having a portion arranged to engage and hold the other end of a mounting plate.

13. A flashlight comprising a tubular handle provided with a casing for a battery, a seat on the handle for the mounting plate of a reel, a member slidable on the handle and secured in a fixed position adjacent its forward extremity, means for engaging one end of a mounting plate associated with the member, said member providing a housing for a lamp, a switch for controlling the operation of a lamp, a finger grip slidably mounted on the handle, and a cap carried by the handle for actuating the finger grip to engage the opposite end of a mounting plate for holding the plate on the seat.

14. A flashlight comprising a tubular handle providing a casing for a battery, a seat for the mounting plate of a reel provided on the handle, an enlargement provided on the handle forming a housing for a lamp, a switch for controlling the operation of a lamp, means for engaging and holding one end of a mounting plate, a finger grip slidably mounted on the handle, a handle grip slidably mounted on the handle, and a cap carried by the handle for urging the handle grip against the finger grip to cause the finger grip to engage the other end of a mounting plate for detachably holding a plate on said seat.

15. A flashlight comprising a tubular handle providing a casing for a battery, a socket for a lamp and a switch carried by the handle, a seat provided on the handle for the mounting plate of a reel, means for engaging one end of a mounting plate, a holding member slidable on the handle, a sleeve slidable on the handle, a handle grip mounted on the sleeve, and a cap carried by the handle for holding a battery in the casing, maintaining the handle grip and sleeve assembled with respect to each other and with respect to the handle, and for pressing the sleeve against the holding member to cause the latter to engage the other end of a mounting plate to detachably secure a mounting plate in relation to said seat.

16. A tubular metal handle for a fishing rod comprising a central section, a forward section for supporting a rod and a rear section, said central section having a portion constituting a seat for a reel plate and having a first clamp thereon, a second clamp on the central section having a part thereof adapted to engage a portion of a reel plate, and a lamp housed in the second clamp at a location opposite its reel plate engaging part, said central section and rear section providing a chamber for a battery adapted to be placed in circuit with the handle and lamp, and a switch for opening and closing the circuit to control the operation of the lamp.

OSCAR C. GEORGE.

References Cited in the file of this patent

UNITED STATES PATENTS

| Number | Name | Date |
|---|---|---|
| 718,589 | Treadwell | Jan. 13, 1903 |
| 1,159,466 | Bristow | Nov. 9, 1915 |
| 2,111,080 | Stromgren | Mar. 15, 1938 |
| 2,152,385 | Mayer et al. | Mar. 28, 1939 |
| 2,565,633 | Scott | Aug. 28, 1951 |